(12) United States Patent  
Jadidian et al.

(10) Patent No.: US 12,126,378 B2  
(45) Date of Patent: Oct. 22, 2024

(54) OPTICAL OVER-THE-AIR PEER TO PEER COMMUNICATION FOR XR DEVICES

(71) Applicant: MICROSOFT TECHNOLOGY LICENSING, LLC, Redmond, WA (US)

(72) Inventors: Jouya Jadidian, Mountain View, CA (US); Ashley N. Saulsbury, Redmond, WA (US); Mohit Narang, Cupertino, CA (US); Ruben Caballero, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 452 days.

(21) Appl. No.: 17/516,493

(22) Filed: Nov. 1, 2021

(65) Prior Publication Data

US 2023/0139334 A1   May 4, 2023

(51) Int. Cl.
*H04B 10/00* (2013.01)
*H04B 10/114* (2013.01)
*H04B 10/116* (2013.01)
*H04B 10/2575* (2013.01)

(52) U.S. Cl.
CPC ....... *H04B 10/116* (2013.01); *H04B 10/1143* (2013.01); *H04B 10/1149* (2013.01); *H04B 10/25754* (2013.01)

(58) Field of Classification Search
CPC ... H04B 10/11; H04B 10/112; H04B 10/1123; H04B 10/114; H04B 10/1143; H04B 10/1149; H04B 10/116; H04B 10/25754; H04B 10/40; H04B 10/2507; H04B 10/1125; H04B 10/1127

USPC ....... 398/118, 119, 127, 128, 129, 130, 131, 398/135, 136, 33, 38, 158, 159, 172, 115

See application file for complete search history.

(56) References Cited

U.S. PATENT DOCUMENTS 9,838,119 B1 * 12/2017 Stein .................... G01S 3/7835
2018/0062740 A1    3/2018 Ange et al.
2021/0318409 A1 * 10/2021 Lam ..................... G01S 5/0018

FOREIGN PATENT DOCUMENTS

EP           3291585 B1    10/2019

OTHER PUBLICATIONS

"International Search Report and Written Opinion Issued in PCT Application No. PCT/US22/046139", Mailed Date: Jan. 27, 2023, 15 Pages.

* cited by examiner

*Primary Examiner* — Hanh Phan
(74) *Attorney, Agent, or Firm* — Han Gim; Newport IP, LLC

(57) ABSTRACT

An extended reality headset has light-based communication transceivers coupled to the extended reality headset. The relative position of a remote transceiver with respect to the current position and orientation of the extended reality headset is determined. A line-of-sight is calculated from the light-based communication transceivers to the remote transceiver. The light-based communication transceivers emit a light-based communications beam in accordance with the calculated line-of-sight. The light-based communications beam is adjusted in response to changes to the relative position of the remote transceiver with respect to the current position and orientation of the extended reality headset.

18 Claims, 8 Drawing Sheets

OPTICAL OVER-THE-AIR PEER TO PEER COMMUNICATION FOR XR DEVICES

BACKGROUND

Virtual reality ("VR") devices enable users to view and interact with virtual environments. For example, a VR device might enable a user to explore a virtual environment. Augmented reality ("AR") devices enable users to view and interact with virtual objects while simultaneously viewing the physical world around them. For example, an AR device might enable a user to view the placement of virtual furniture in a real-world room. Various devices that enable either or both VR and AR and related types of experiences might be referred to generally as extended reality ("XR") devices. VR devices, AR devices, and XR devices may also be referred to as a near-eye device ("NED") or head-mounted device (HMD). The HMD may interface with a handheld controller and/or other handheld peripheral objects, e.g., as part of a gaming system. To make a gaming experience more immersive, the poses of an HMD and a handheld controller may be tracked as the devices are moved through space by a user to provide inputs to control a user interface of the HMD. Such pose tracking also may be used for other computing device interactions than gaming.

One drawback of XR devices is that they must be tethered to computers in order to provide sufficient adequate data processing and throughput to deliver high-resolution images. However, wearing a data cable reduces mobility and can lead to safety issues. The use of wireless technologies such as WiFi may address some of these issues. One issue with wireless technologies such as WiFi is that they have limitations in supporting the data processing needs of many XR applications, which may require streaming high-resolution, multi-view video in real time. And for XR platforms that have to work in real time, important considerations such as encryption may be compromised. Furthermore, the RF spectrum used by WiFi protocols is susceptible to interference from other wireless devices and other sources of interference, or eavesdropping by malicious parties.

It is with respect to these and potentially other considerations that the disclosure made herein is presented.

SUMMARY

Various techniques and systems are disclosed for using light-based wireless communication technology for providing data communications to/from XR devices. Light-based wireless communications generally utilize light to transmit data between devices. Light-based wireless communications may include technologies such as those referred to as "Li-Fi." More generally, light-based wireless communications may include technologies that are capable of transmitting data at high speeds over the visible light, ultraviolet, and infrared spectra.

The present disclosure describes technologies for implementing an efficient and high throughput light-based wireless communication system that is capable of working with head/body mounted XR devices. Such technologies may allow for continuous communication with the XR devices regardless of the direction/angle of the light-based communications transceivers for the head/body mounted XR devices.

XR platforms typically have design constraints in terms of space and power. Replacement of RF-based antenna systems with optical transceivers can provide efficient and high-capacity communications for XR platforms. Light-based communications can be effectively focused to individual users, enabling applications such as mass hallucination and metaverse in crowded areas using optical point-to-point connections.

Additionally, optical point-to-point communications can be secured physically, whereas RF signals can be sniffed and their entire security can be accessed in the digital domain. Finally, antennas can be difficult to design in a modular fashion due to RF losses across connectors. Optical modules, however, can be modularized across digital, analog, or optical links. Additionally, they can be used in different scenarios as add-on modules.

It should be appreciated that the subject matter described briefly above and in further detail below can be implemented as a computer-implemented method, a computer-controlled apparatus or device, a computing system, or an article of manufacture, such as a computer storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those specifically described herein, including multiprocessor systems, microprocessor-based or programmable consumer electronics, minicomputers, mainframe computers, handheld computers, smartphones, personal digital assistants, smart watches, e-readers, tablet computing devices, special-purposed hardware devices, network appliances, and the like.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
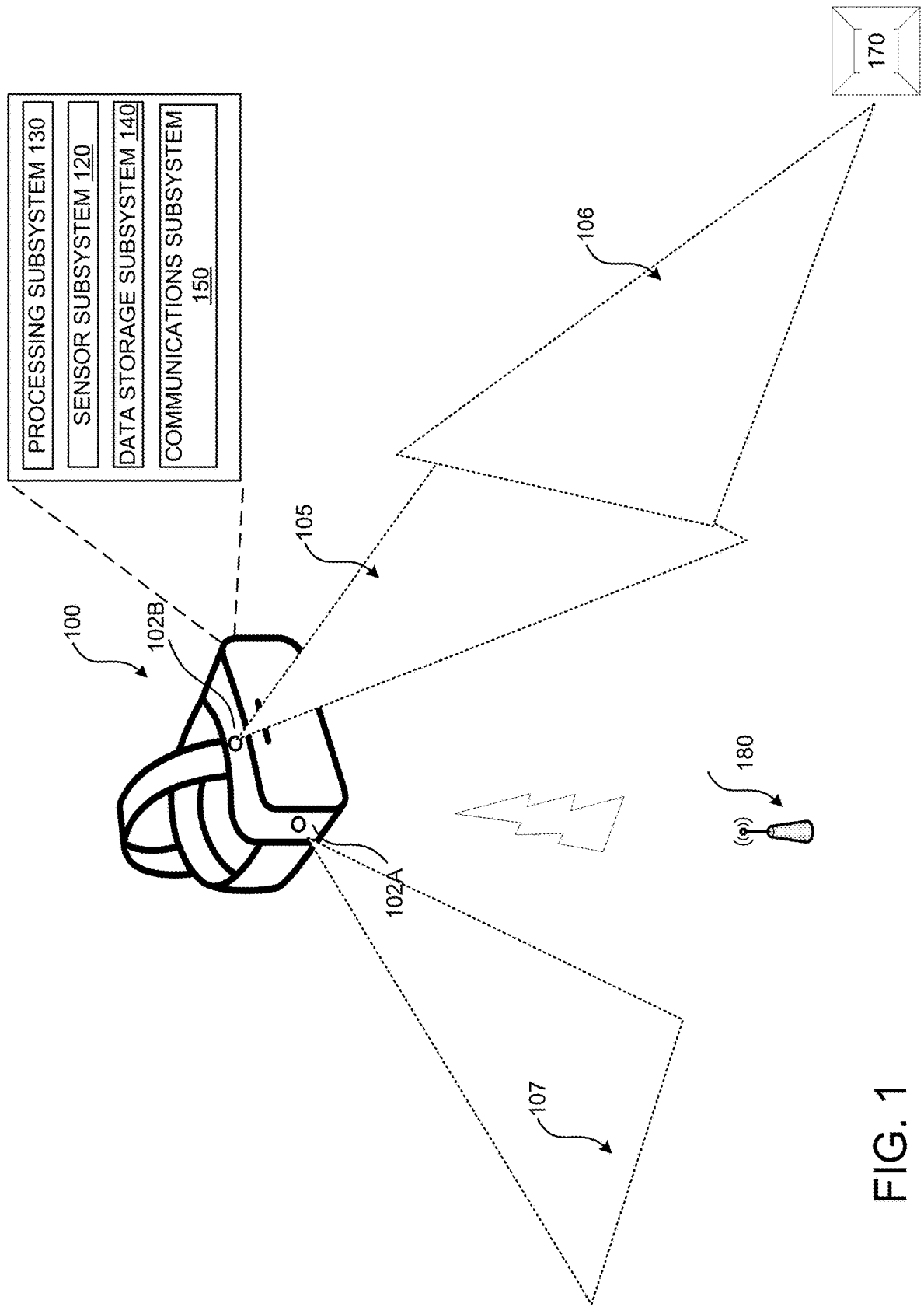
FIG. 1 is a computing device diagram showing aspects of a XR device that can be utilized to implement the various configurations disclosed herein.

HMD devices typically project or otherwise provide the user's eyes with virtual images in conjunction with the user's surroundings. In order to need to provide such functionality, the HMD must determine where the HMD is located, where the user is located, what objects are in the vicinity, and what the user is looking at. In response the HMD may communicate with one or more systems (e.g., cloud-based systems) to obtain data in order to provide real-time information and graphics to the HMD. The HMD therefore requires high bandwidth communications to access the cloud-based data. As discussed, RF-based communications such as Wifi and Bluetooth may have limited bandwidth and are subject to interference. XR devices typically operate in real-time so that a user may move about within a scene or area of interest and view timely rendered images. An XR device may thus need to provide a sufficient update rate for generating images, such that the user may view, for example, an augmented image in which the virtual parts are rendered without any visible jumping or jerking. If there are delays in calculating the XR device position or the correct alignment, then the augmented objects may tend to lag behind motions in the rendered image.

The use of light-based communications technologies may address such shortcomings as well as provide a number of advantages over RF-based communications. Furthermore, the HMD's continuously updated knowledge of location and orientation can be leveraged to facilitate seamless coverage between light-based transceivers. In an embodiment, the HMD may have at least one optical transceiver. The HMD's optical transceiver may communicate with at least one other optical transceiver to communicate data. The HMD's knowledge of its location and orientation may be used to enable the transceivers to remain in coverage and thus maintain a continuous data link as the HMD moves and changes orientation.

The optical point-to-point link(s) can be implemented in a number of scenarios depending on numbers and locations of the transceivers on the HMD and in the user environment. In one scenario, the HMD may have a plurality of optical transceivers, where at any given time one of the transceivers may be selected for optical communications based on the location and orientation of the HMD. A transceiver on the HMD may be selected based on a likelihood that the selected transceiver will be in the optical signal footprint of a target optical transceiver. In some embodiments, the local environment may have a plurality of transceivers. In this scenario, a transceiver on the HMD may be selected based on a likelihood that the selected transceiver will be in the optical signal footprint of one of the target optical transceivers.

In some embodiments, the transceiver(s) on the HMD may have a steerable element that enables the HMD transceiver(s) to be pointed toward a target transceiver (e.g., access point or other light-based device) as the HMD moves and changes orientation. For example, the HMD can have one transceiver and a set of movable mirrors to direct the light signals to the target transceiver.

In some embodiments, an electronic steering approach may be implemented where a transceiver among multiple transceivers may be selectively chosen to provide an optimal line-of-sight (LOS). The use of multiple transceivers can provide redundancy and enable multi-input multi-output communication simultaneously between XR devices and access points. This approach does not require mechanical parts and may therefore be more reliable and easier to manufacture. The electronic steering approach may allow for full 360-degree coverage around the XR device and access point.

In some embodiments, a mechanical steering approach may be implemented where instead of selecting between multiple transceivers, a single transceiver or a pair of transceivers may be used and are mechanically steered using MEMS mirror technology to point the light beam towards its counterpart. This approach may allow for tightening of the beam to achieve longer ranges, reduce power, and allow for multiple simultaneous channels to be spatially separated.

The HMD transceiver may be configured with various light dispersion patterns based on the particular environment in which the HMD will be used. For example, the HMD transceiver may have a wider pattern when connection distances are expected to be shorter, and a narrower pattern when the light-based communications distance is expected to be farther.

The HMD may have a plurality of fixed light-based transceivers, or one or more steerable transceivers. A variety of configurations are possible due to the HMD having native capabilities to continuously determine its position and orientation, thus allowing the light-based communication system to continuously adjust its transceivers in order to maintain its light-based links.

The HMD may additionally utilize RF-based communications to provide additional communications with external systems. For example, the HMD may utilize RF-based communications to continuously send HMD status, position, orientation, acceleration, and other data to the external system. The external system may use this data to steer fixed light-based transceivers to the HMD, or otherwise assist in establishing or maintaining light-based communications with the HMD.

While many of the examples described herein assume a single HMD in various environments, the disclosed embodiments may also be used in scenarios where multiple HMDs are using light-based communications in a given environment.

The described technologies can enable the reduction of lost or erroneous inputs at XR devices and reduce the utilization of computing resources such as processor cycles and battery power. Technical benefits other than those specifically described herein might also be realized through implementations of the disclosed technologies.

Turning now to the figures (which might be referred to herein as a "FIG." or "FIGS."), additional details will be provided regarding the technologies disclosed herein with reference to the accompanying drawings that form a part hereof. The FIGS. show, by way of illustration, specific configurations or examples. Like numerals represent like or similar elements throughout the FIGS.

In the FIGS., the left-most digit(s) of a reference number identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

FIG. 1 is a computing device diagram showing aspects of the configuration and operation of a XR device 100 that can be utilized to implement some of the various technologies disclosed herein. The XR device 100, alone or in combination with one or more other devices (e.g., a local computer or one or more remotely located server computers), might form a system that performs or otherwise implements some of the various processes and techniques described herein.

In the configuration shown in FIG. 1, the XR device 100 takes the form of a wearable, head-mounted display device that is worn by a user. It will be understood, however, that the XR device 100 might take a variety of different forms other than the specific configuration depicted in FIG. 1.

As discussed in greater detail below, the technologies disclosed herein can also be utilized with AR devices. Although the configurations disclosed herein are discussed primarily in the context of AR and VR devices, it is to be appreciated that the technologies disclosed herein can also be utilized with MR devices and other types of devices that include, but are not limited to, smartphones, video game systems, tablet computing devices, and smartwatches.

The XR device 100 may include one or more display panels (not shown in FIG. 1) that display computer generated ("CG") graphics. For example, the XR device 100 might include a right-eye display panel for right-eye viewing and a left-eye display panel for left-eye viewing. A right-eye display panel is typically located near a right eye of the user to fully or partially cover a field of view of the right eye, and a left-eye display panel is located near a left eye of the user to fully or partially cover a field of view of the left eye.

In another example, a unitary display panel might extend over both the right and left eyes of a user, and provide both right-eye and left-eye viewing via right-eye and left-eye viewing regions of the unitary display panel. In each of these implementations, the ability of the XR device 100 to separately display different right-eye and left-eye graphical content via right-eye and left-eye displays might be used to provide a user of the XR device 100 with a stereoscopic viewing experience.

The XR device 100 might include a variety of on-board sensors forming a sensor subsystem 120. The XR device 100 might also include transceivers for communicating with other systems and networks. For example, and without limitation, the sensor subsystem 120 might include one or more outward facing optical cameras (not shown in FIG. 1) (e.g., cameras located on an external surface of the XR device 100 and forward facing in a viewing direction of the user. The XR device 100 can also include one or more inward facing optical cameras (not shown in FIG. 1) (e.g., rearward facing toward the user and/or toward one or both eyes of the user).

The sensor subsystem 120 can also include a variety of other sensors (not shown in FIG. 1) including, but not limited to, accelerometers, gyroscopes, magnetometers, environment understanding cameras, depth cameras, inward or outward facing video cameras, microphones, ambient light sensors, and potentially other types of sensors. Data obtained by the sensors, including the cameras of the sensor subsystem 120 can be utilized to detect the location, orientation (which might be referred to as a "pose"), and movement of the XR device 100. The location, orientation, and movement of the XR device 100 can be utilized to compute the view of the VR environment presented to the user by the XR device 100. The location, orientation, and movement of the XR device 100 can also be utilized to facilitate light-based communications as further described herein.

One or more outward facing optical cameras of the XR device 100 can be configured to observe the real-world environment and output digital images illustrating the real-world environment observed by the one or more outward facing optical cameras.

The XR device 100 might also include a processing subsystem 130 that includes one or more processor devices that perform some or all of the processes or operations described herein, as defined by instructions executed by the processing subsystem 130. Such processes or operations might include generating and providing image signals to the display panels, receiving sensory signals from sensors in the sensor subsystem 120 such as the transceivers 102, enacting control strategies and procedures responsive to those sensory signals. Other computing systems, such as local or remote computing systems might also perform some or all of the computational tasks disclosed herein.

The XR device 100 might also include an on-board data storage subsystem 140 that includes one or more memory devices storing computer-executable instructions (e.g., software and/or firmware) executable by the processing subsystem 130, and might additionally hold other suitable types of data. The XR device 100 might also include a communications subsystem 150 supporting wired and/or wireless communications with remote devices (i.e., off-board devices) over a communications network (not shown in FIG. 1). As an example, the communication subsystem 150 might be configured to wirelessly send or receive a video stream, audio stream, coordinate information, virtual object descriptions, and/or other information from remote devices to render virtual objects and textures on the integrated displays of the XR device 100. Examples of VR devices include, but are not limited to, the HTC VIVE VR device and the OCULUS RIFT VR device.

In some implementations, the XR device 100 may operate in conjunction with a controller, for example, for a video game system. The controller may, in some examples, include an onboard processor, storage system, and communication system. The controller may also include one or more input controls, such as a button, trigger, joystick, directional pad, touch screen, etc. The controller may comprise an inertial measurement unit (IMU) (which may include an accelerometer, gyroscope, magnetometer, and/or other suitable sensors) that provides output related to changes in position and orientation of the controller. In some examples, the XR device 100 may also include an IMU to help track changes in the HMD pose in the environment.

FIG. 1 also illustrates a light-based access point 170 that may have one or more light sources distributed over a surface of the light-based access point 170. FIG. 1 shows the XR device 100 having two XR transceivers 102A and 102B. In other embodiments, XR device 100 may have a plurality of transceivers distributed along an exterior of the XR device 100.

In some embodiments, the XR device 100 may be configured to communicate with other devices using RF protocols, such as via a wireless network connecting utilizing a Bluetooth communication protocol or other suitable wireless communication protocol to communicate with access point 180. In other embodiments, an optional host computing device (not shown) may communicate with the XR device 100 to receive data from XR device 100 (including data acquired or generated by the XR device 100), to process such data, and to send control signals to these devices. It should be understood that while described herein in the context of specific communication protocols shown in the FIGS. are presented for the purpose of example, and any other suitable communications protocols, may be used for HMD-to-host communication.

The XR device 100 typically needs information to determine where the user or the device is located in reference to the surroundings. Furthermore, the point of view of the XR device 100 should be tracked. A tracking system may recognize movements and project the graphics related to the real-world environment the user is observing at any given moment. Various location determination methods may be used, including those that reference external systems such as GPS, as well as internal location estimation methods. The XR device 100 may further be configured to recognize one or more items within captured images using object recognition.

Figure 2:
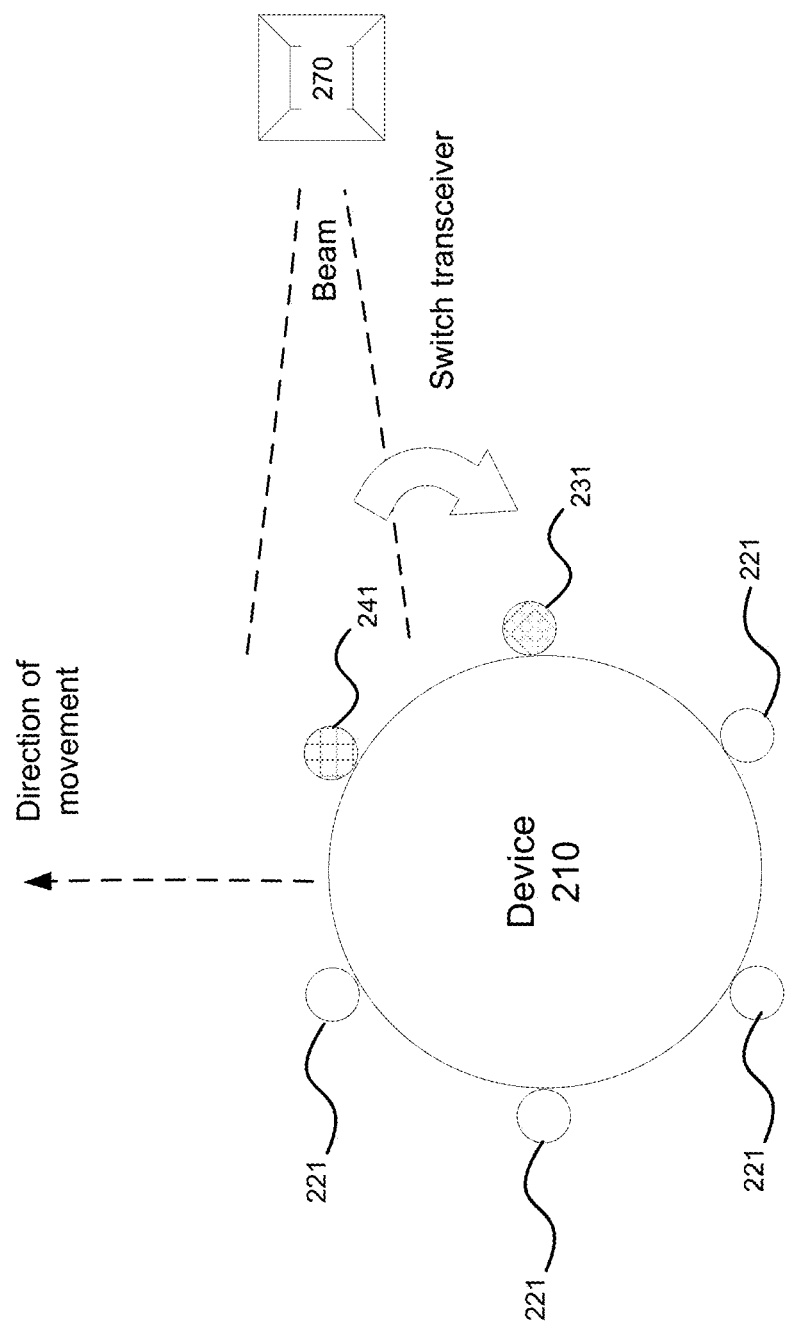
FIG. 2 is a diagram showing aspects of the configuration and operation of a XR device that can be utilized to implement the various configurations disclosed herein.

Referring to FIG. 2, illustrated is one example of an implementation of light-based transceivers on a XR device 210. The XR device 210 may have a plurality of light-based transceivers 221, 231, and 241 that are located around a perimeter of the XR device 210. An external access point 270 may transmit signals that may be focused on a given beam shape that is initially in communication with transceiver 241 on XR device 210. As the XR device 210 moves such that the beam shape is covered by light-based transceiver 231, the XR device 210 may switch from transceiver 241 to transceiver 231 to enable continuous coverage by the access point 270 during movement of the XR device 210.

Figure 3:
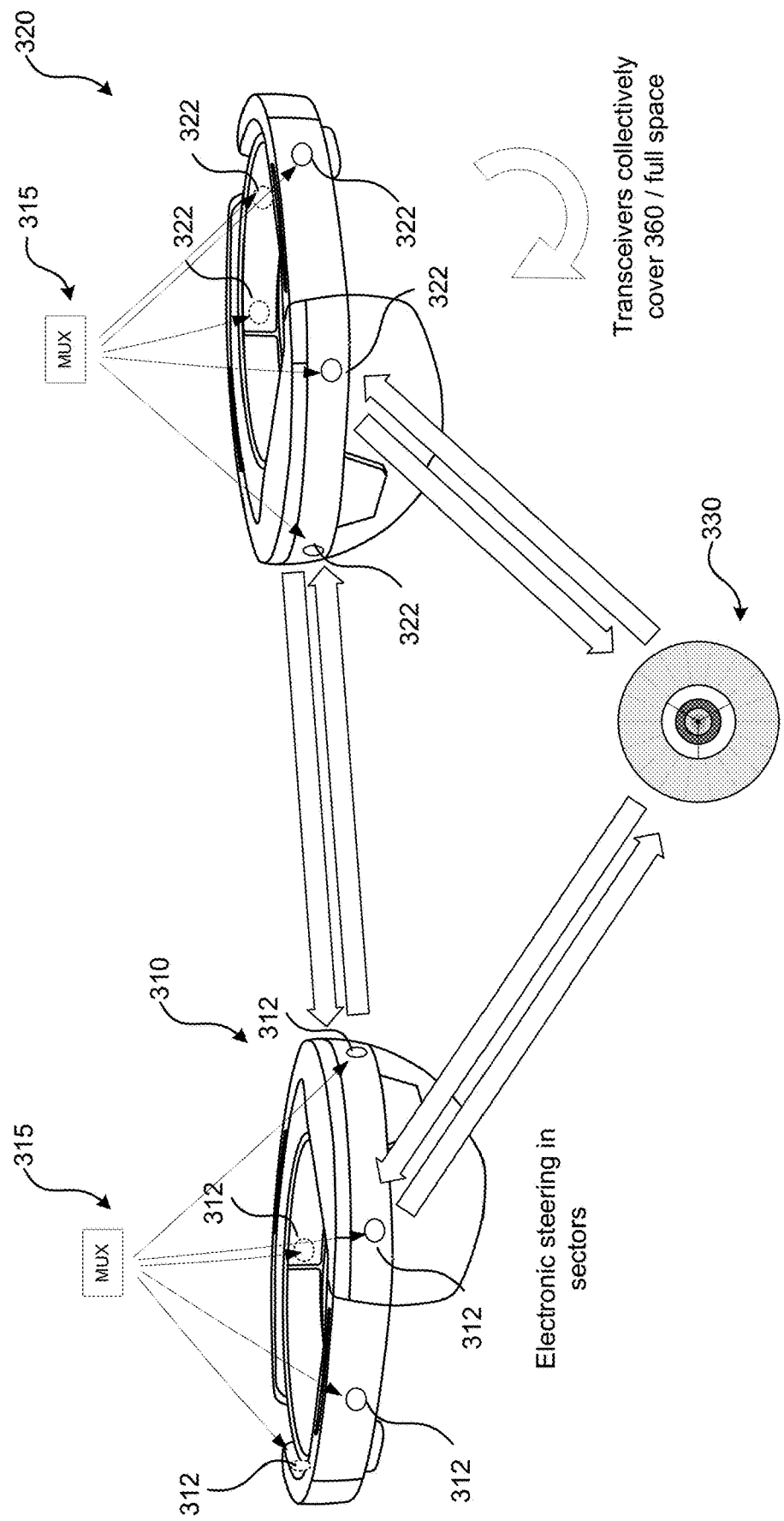
FIG. 3 is a diagram showing aspects of the configuration and operation of multiple XR devices that can be utilized to implement the various configurations disclosed herein.

Referring to FIG. 3, illustrated is one example of an implementation of light-based transceivers on XR devices 310 and 320. The XR devices 310 and 320 may have a multiplexer 315. The XR devices 310 and 320 may also have a plurality of light-based transceivers 312 and 322 that are located around a perimeter of the XR devices 310 and 320. An external access point 330 may emit light signals that may be focused on a given beam shape. The light-based transceivers 312 and 322 may be selected to provide an optimal line-of-sight to the access point 330. The light-based transceivers 312 and 322 may also be selected to provide line-of-sight between the XR devices 310 and 320. The multiple transceivers 312 and 322 provide redundancy in the event of failure, overlapping coverage to account for obstructions to the light signals, and enable multiple input multiple output communications between the XR devices 310 and 320 and access point 330 as well as other access points (not shown). The configuration shown in FIG. 3 may provide for full 360-degree coverage around each XR device.

Figure 4A:
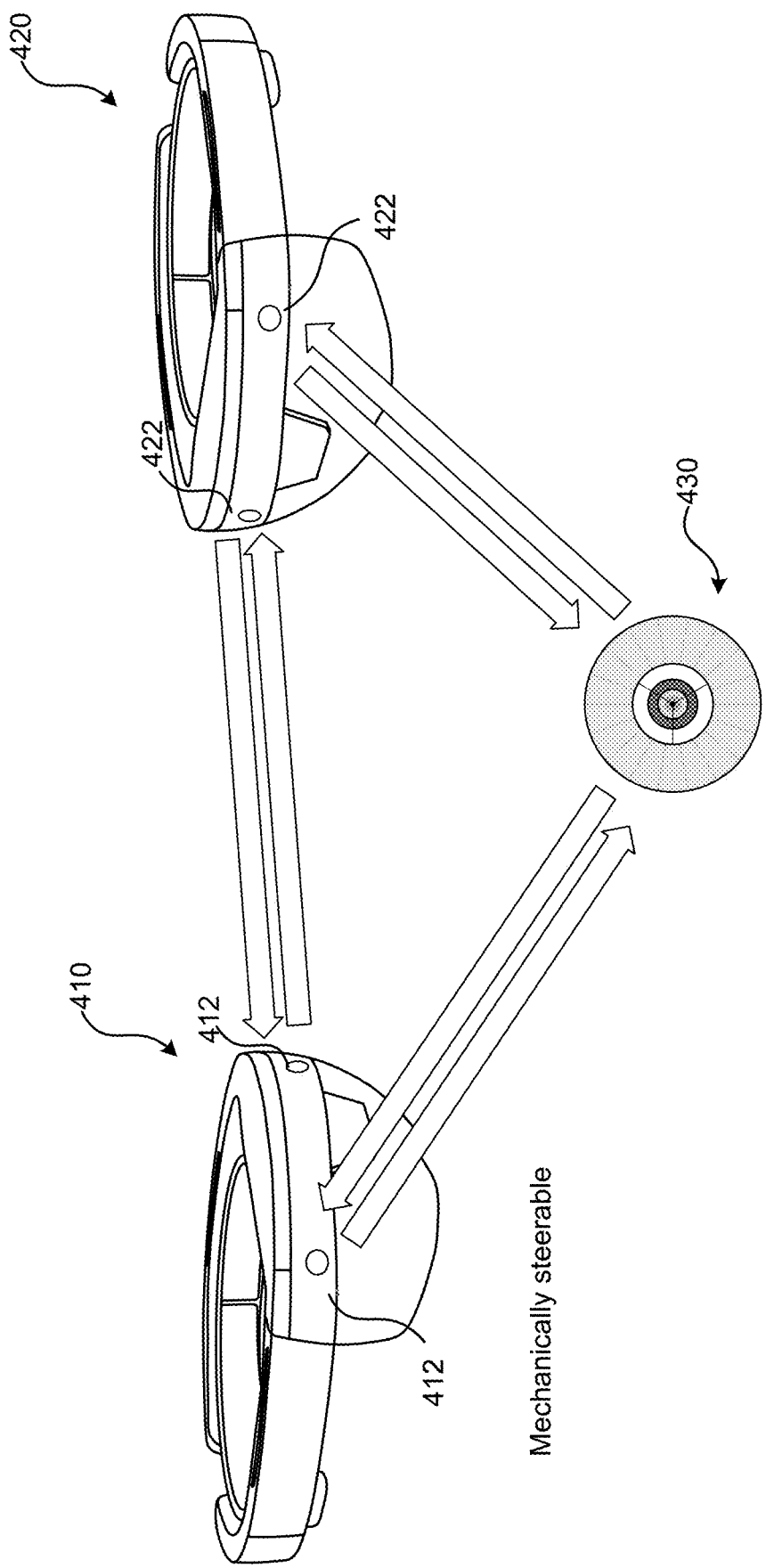
FIG. 4A is a diagram showing aspects of the configuration and operation of multiple XR devices that can be utilized to implement the various configurations disclosed herein.

Referring to FIG. 4A, illustrated is another example of an implementation of light-based transceivers on XR devices 410 and 420. The XR devices 410 and 420 may have, in this example, light-based transceivers 412 and 422 that are located at predetermined locations at the XR devices 410 and 420. An external access point 430 may emit light signals that may be focused on a given beam shape. The light-based transceivers 412 and 422 may be mechanically selected to provide an optimal line-of-sight to the access point 430. The light-based transceivers 412 and 422 may also be mechanically steered to provide line-of-sight between the XR devices 410 and 420. This approach may allow for more fine-grained shaping of the light signal, helping to achieve longer ranges, reduce power, and allow for multiple spatially separated channels.

Figure 4B:
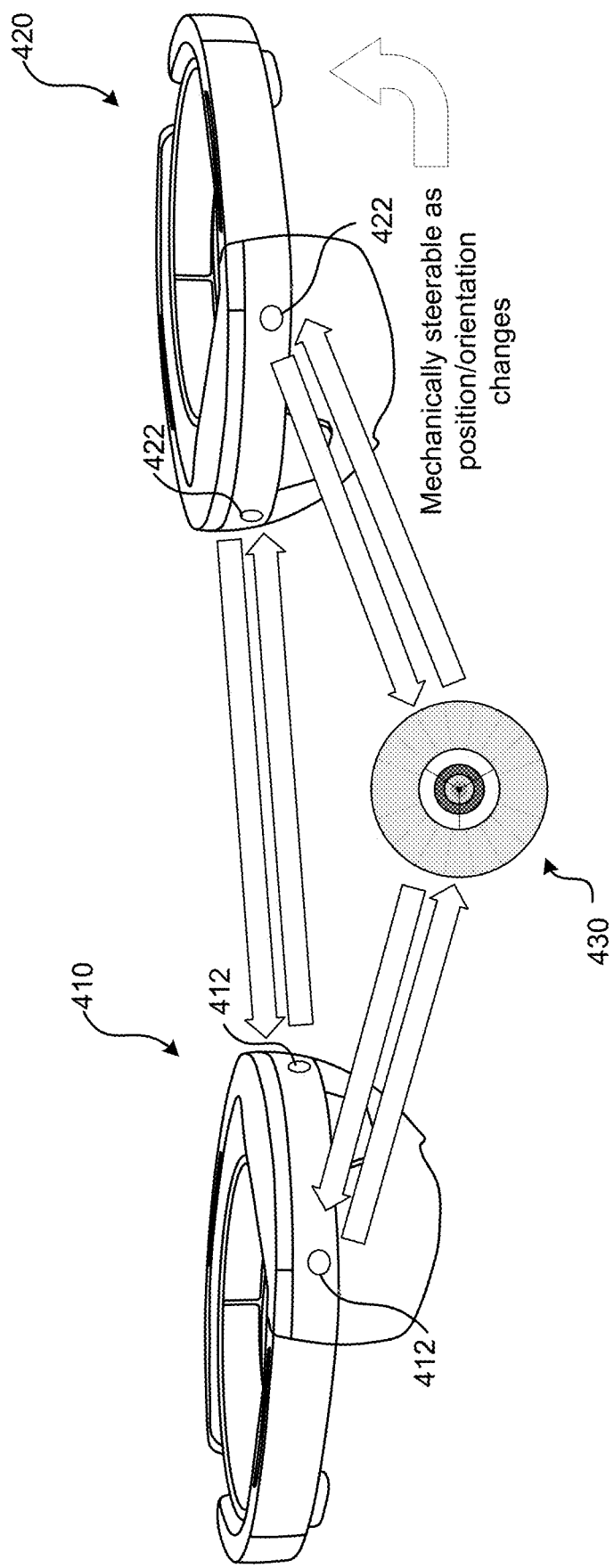
FIG. 4B is a diagram showing aspects of the configuration and operation of multiple XR devices that can be utilized to implement the various configurations disclosed herein.

FIG. 4B illustrates that the transceivers 412 and 422 may be mechanically steered to maintain a line-of-sight to the access point 430 as the XR devices 410 and 420 move, as the access point 430 moves, or both.

Figure 5:
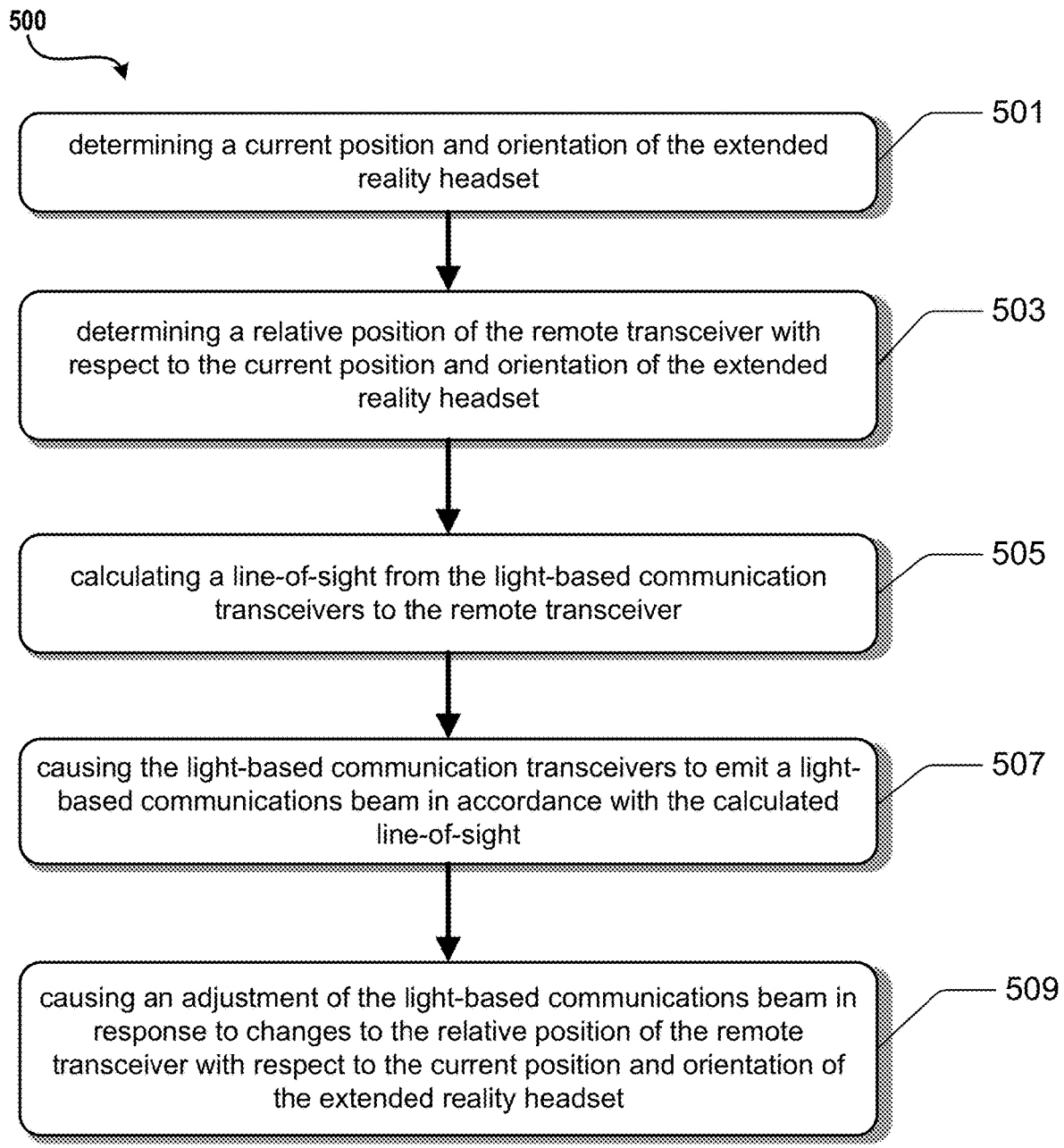
FIG. 5 is a flowchart depicting an example procedure for implementing light-based communication in accordance with the present disclosure.
Figure 6:
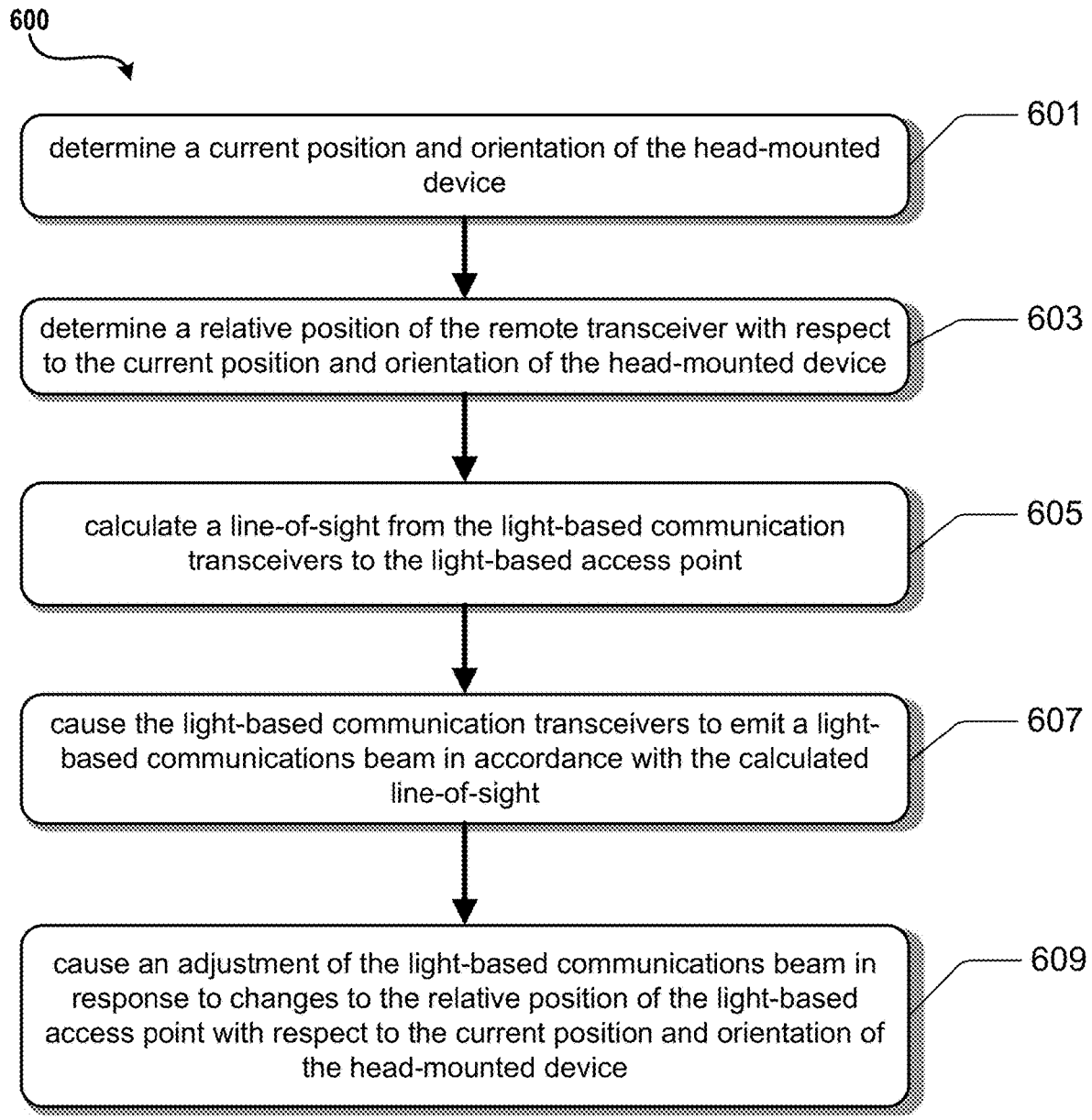
FIG. 6 is a flowchart depicting an example procedure for implementing light-based communication in accordance with the present disclosure.

FIGS. 5 and 6 are flow diagrams showing aspects of a routine disclosed herein for providing light-based communications in a XR headset.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates determining a current position and orientation of the extended reality headset.

Operation 501 may be followed by operation 503. Operation 503 illustrates determining a relative position of the remote transceiver with respect to the current position and orientation of the extended reality headset.

Operation 503 may be followed by operation 505. Operation 505 illustrates calculating a line-of-sight from the light-based communication transceivers to the remote transceiver.

Operation 505 may be followed by operation 507. Operation 507 illustrates causing the light-based communication transceivers to emit a light-based communications beam in accordance with the calculated line-of-sight.

Operation 507 may be followed by operation 509. Operation 509 illustrates causing an adjustment of the light-based communications beam in response to changes to the relative position of the remote transceiver with respect to the current position and orientation of the extended reality headset.

Turning now to FIG. 6, illustrated is an example operational procedure for data communication between an extended reality headset and a remote transceiver using light-based communication, in accordance with the present disclosure. The operational procedure may be implemented in a system comprising an extended reality headset configured to track position and orientation movement of the extended reality headset. The extended reality headset may have one or more light-based communication transceivers coupled to the extended reality headset. The system may also include a light-based access point configured to transmit and receive light-based communication signals with one or more devices.

Referring to FIG. 6, operation 601 illustrates determining a current position and orientation of the extended reality headset.

Operation 601 may be followed by operation 603. Operation 603 illustrates determining a relative position of the remote transceiver with respect to the current position and orientation of the extended reality headset.

Operation 603 may be followed by operation 605. Operation 605 illustrates calculating a line-of-sight from the light-based communication transceivers to the light-based access point.

Operation 605 may be followed by operation 607. Operation 607 illustrates causing the light-based communication transceivers to emit a light-based communications beam in accordance with the calculated line-of-sight.

Operation 607 may be followed by operation 609. Operation 609 illustrates causing an adjustment of the light-based communications beam in response to changes to the relative position of the light-based access point with respect to the current position and orientation of the extended reality headset.

Figure 7:
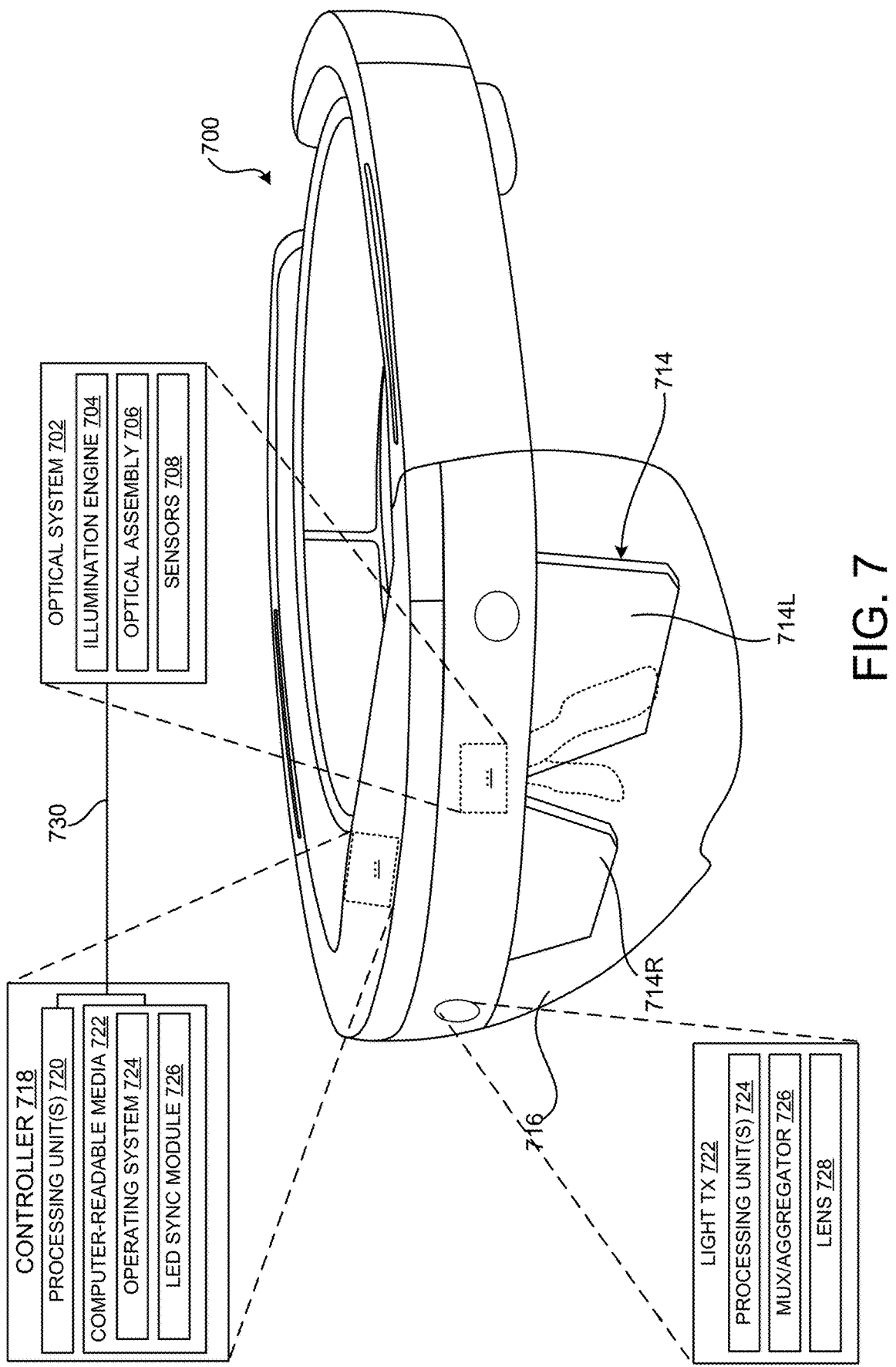
FIG. 7 is a device diagram showing aspects of an HMD device that can be utilized to implement the various configurations disclosed herein.

FIG. 7 is a computing device diagram showing aspects of the configuration of an XR device 700 that can be utilized to implement the various configurations disclosed herein. XR devices may superimpose CG images over a user's view of a real-world environment. For example, an XR device 700 such as that shown in FIG. 7 might generate composite views to enable a user to visually perceive a CG image superimposed over a visually perceived physical object that exists within a real-world environment.

In the example shown in FIG. 7, an optical system 702 includes an illumination engine 704 to generate electromagnetic ("EM") radiation, including some or all of the visible-light portion of the EM spectrum. In this example, the optical system 702 further includes an optical assembly 706 that is positioned to receive the EM radiation from the illumination engine 704 and to direct the EM radiation (or individual bandwidths thereof) along one or more predetermined optical paths. For example, the illumination engine 704 may emit the EM radiation into the optical assembly 706.

In some instances, a user experience is dependent on the XR device 700 accurately identifying characteristics of a physical object or plane and then generating the CG image in accordance with these identified characteristics. For example, suppose that the XR device 700 is programmed to generate a user perception that a virtual gaming character is running towards and ultimately jumping over a real-world structure. To achieve this user perception, the XR device 700 might obtain detailed data defining features of the real-world terrain around the XR device 700.

In some examples, the XR device 700 utilizes an optical system 702 to generate a composite view (e.g., from a perspective of a user that is wearing the XR device 700) that includes both one or more CG images and a view of at least a portion of the real-world environment. For example, the optical system 702 might utilize various technologies such as, for example, AR technologies to generate composite views that include CG images superimposed over a real-world view. As such, the optical system 702 might be configured to generate CG images via an optical assembly 706 that includes a display panel 714.

In the illustrated example, the display panel includes separate right eye and left eye transparent display panels, labeled 714R and 714L, respectively. In some examples, the display panel 714 includes a single transparent display panel that is viewable with both eyes or a single transparent display panel that is viewable by a single eye only. Therefore, it can be appreciated that the techniques described herein might be deployed within a single-eye device (e.g., the GOOGLE GLASS AR device) and within a dual-eye device (e.g., the MICROSOFT HOLOLENS AR device).

Light received from the real-world environment passes through the see-through display panel 714 to the eye or eyes of the user. Graphical content displayed by right-eye and left-eye display panels, if configured as see-through display panels, might be used to visually augment or otherwise modify the real-world environment viewed by the user through the see-through display panels 714. In this configuration, the user is able to view virtual objects that do not exist within the real-world environment at the same time that the user views physical objects within the real-world environment. This creates an illusion or appearance that the virtual objects are physical objects or physically present light-based effects located within the real-world environment.

In some examples, the display panel 714 is a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the XR device 700 further includes an additional see-through optical component, shown in FIG. 7 in the form of a transparent veil 716 positioned between the real-world environment and the display panel 714. It can be appreciated that the transparent veil 716 might be included in the XR device 700 for purely aesthetic and/or protective purposes.

The XR device 700 might further include various other components (not all of which are shown in FIG. 7), for example, cameras (e.g. RGB, B&W, or IR cameras), speakers, microphones, accelerometers, gyroscopes, magnetometers, temperature sensors, touch sensors, biometric sensors, other image sensors, energy-storage components (e.g. battery), a communication facility, a global positioning system ("GPS") a receiver and, potentially, other types of sensors. Data obtained from one or more sensors 708, some of which are identified above, can be utilized to determine the orientation, location, and movement of the XR device 700.

In the illustrated example, the XR device 700 includes transceivers 722 that are configured to provide light-based communications. The transceivers 722 main include processing units 724, multiplexer/demultiplexer/aggregator 726, and lens 728.

In the illustrated example, the XR device 700 includes one or more logic devices and one or more computer memory devices storing instructions executable by the logic device(s) to implement the functionality disclosed herein. In particular, a controller 718 can include one or more processing units 720, one or more computer-readable media 722 for storing an operating system 724, other programs (such as a LED synchronization module 726 configured to in the manner disclosed herein), and data.

In some implementations, the XR device 700 (and MR devices) is configured to analyze data obtained by the sensors 708 to perform feature-based tracking of an orientation of the XR device 700. For example, in a scenario in which the object data includes an indication of a stationary object within the real-world environment (e.g., a table), the XR device 700 might monitor a position of the stationary object within a terrain-mapping field-of-view ("FOV"). Then, based on changes in the position of the stationary object within the terrain-mapping FOV and a depth of the stationary object from the XR device 700, the XR device 700 might calculate changes in the orientation of the XR device 700.

It can be appreciated that these feature-based tracking techniques might be used to monitor changes in the orientation of the XR device 700 for the purpose of monitoring an orientation of a user's head (e.g., under the presumption that the XR device 700 is being properly worn by a user). The computed orientation of the XR device 700 can be utilized in various ways, some of which have been described above.

The processing unit(s) 720, can represent, for example, a central processing unit ("CPU")-type processing unit, a graphics processing unit ("GPU")-type processing unit, a field-programmable gate array ("FPGA)", one or more digital signal processors ("DSPs"), or other hardware logic components that might, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 722, can store instructions executable by the processing unit(s) 720, such as instructions which, when executed, provide light-based communications synchronization in the manner disclosed herein. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Based on the foregoing, it should be appreciated that technologies for light-based communication have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the claims below.

The disclosure presented herein also encompasses the subject matter set forth in the following clauses:

Clause 1. A method for data communication between an extended reality headset and a remote transceiver using light-based communication, the extended reality headset configured to track position and orientation movement of the extended reality headset, the extended reality headset having one or more light-based communication transceivers coupled to the extended reality headset, the method comprising:

determining a current position and orientation of the extended reality headset;

determining a relative position of the remote transceiver with respect to the current position and orientation of the extended reality headset;

calculating a line-of-sight from the light-based communication transceivers to the remote transceiver;

causing the light-based communication transceivers to emit a light-based communications beam in accordance with the calculated line-of-sight; and causing an adjustment of the light-based communications beam in response to changes to the relative position of the remote transceiver with respect to the current position and orientation of the extended reality headset.

Clause 2. The method of clause 1, wherein the adjustment of the light-based communications beam is caused by electrical steering.

Clause 3. The method of any of clauses 1 or 2, wherein the adjustment of the light-based communications beam is caused by mechanical steering.

Clause 4. The method of any of clauses 1-3, wherein the light-based communication transceivers are situated around a perimeter of the extended reality headset; and the method further comprising selecting one of the light-based communication transceivers based on the calculated line-of-sight;

wherein the light-based communications beam is emitted from the selected light-based communication transceiver.

Clause 5. The method of any of clauses 1-4, wherein the mechanical steering is implemented using movable mirrors.

Clause 6. The method of any of clauses 1-5, further comprising:

determining a relative position of a remote headset with respect to the current position and orientation of the extended reality headset;

calculating a second line-of-sight from the light-based communication transceivers to the remote headset; and causing the light-based communication transceivers to emit a second light-based communications beam in accordance with the calculated second line-of-sight.

Clause 7. The method of any of clauses 1-6, further comprising causing an adjustment of the second light-based communications beam in response to changes to the relative position of the remote headset with respect to the current position and orientation of the extended reality headset.

Clause 8. The method of any of clauses 1-7, wherein causing the adjustment of the light-based communications beam comprises selecting a different light-based communication transceiver to emit the light-based communications beam.

Clause 9. The method of any of clauses 1-8, further comprising sending the current position and orientation of the extended reality headset to a remote system via a secondary communications link.

Clause 10. A system, comprising:

an extended reality headset configured to track position and orientation movement of the extended reality headset, the extended reality headset having one or more light-based communication transceivers coupled to the extended reality headset;

a light-based access point configured to transmit and receive light-based communication signals with one or more devices; and the extended reality headset comprising a computer storage medium having instructions stored thereupon which, when executed by a processor, cause the extended reality headset to:

determine a current position and orientation of the extended reality headset;

determine a relative position of the remote transceiver with respect to the current position and orientation of the extended reality headset;

calculate a line-of-sight from the light-based communication transceivers to the light-based access point;

cause the light-based communication transceivers to emit a light-based communications beam in accordance with the calculated line-of-sight; and cause an adjustment of the light-based communications beam in response to changes to the relative position of the light-based access point with respect to the current position and orientation of the extended reality headset.

Clause 11. The system of clause 10, wherein the adjustment of the light-based communications beam is caused by electrical steering.

Clause 12. The system of any of clauses 10 or 11, wherein the adjustment of the light-based communications beam is caused by mechanical steering.

Clause 13. The system of any of clauses 10-12, the extended reality headset further comprising instructions stored on the computer storage medium which, when executed by the processor, cause the extended reality headset to send the current position and orientation of the extended reality headset to the light-based access point via a secondary communications link.

Clause 14. The system of any of clauses 10-13, wherein the light-based access point is further configured to:

receive the current position and orientation from the extended reality headset; and in response to the received current position and orientation, cause an adjustment of a light-based communications beam emitted by the light-based access point in a direction of the received current position and orientation.

Clause 15. A head-mounted device comprising:

one or more light-based communication transceivers coupled to the head-mounted device;

a processor; and a computer storage medium having instructions stored thereupon which, when executed by the processor, cause the head-mounted device to perform operations comprising:

determine a current position and orientation of the head-mounted device;

determine a relative position of the remote transceiver with respect to the current position and orientation of the head-mounted device;

calculate a line-of-sight from the light-based communication transceivers to the light-based access point;

cause the light-based communication transceivers to emit a light-based communications beam in accordance with the calculated line-of-sight; and cause an adjustment of the light-based communications beam in response to changes to the relative position of the light-based access point with respect to the current position and orientation of the head-mounted device.

Clause 16. The head-mounted device of clause 15, wherein the adjustment of the light-based communications beam is caused by electrical steering.

Clause 17. The head-mounted device of clauses 15 or 16, wherein causing the adjustment of the light-based communications beam comprises selecting a different light-based communication transceiver to emit the light-based communications beam.

Clause 18. The head-mounted device of any of clauses 15-17, wherein the adjustment of the light-based communications beam is caused by mechanical steering.

Clause 19. The head-mounted device of any of clauses 15-18, wherein the light-based communication transceivers are situated around a perimeter of the extended reality headset, the computer storage medium having instructions stored thereupon which, when executed by the processor, cause the head-mounted device to perform operations comprising:

select one of the light-based communication transceivers based on the calculated line-of-sight; wherein the light-based communications beam is emitted from the selected light-based communication transceiver.

Clause 20. The head-mounted device of any of clauses 15-19, the computer storage medium having instructions stored thereupon which, when executed by the processor, cause the head-mounted device to perform operations comprising:

determine a relative position of a remote device with respect to the current position and orientation of the head-mounted device;

calculate a second line-of-sight from the light-based communication transceivers to the remote device;

cause the light-based communication transceivers to emit a second light-based communications beam in accordance with the calculated second line-of-sight; and cause an adjustment of the second light-based communications beam in response to changes to the relative position of the remote device with respect to the current position and orientation of the head-mounted device.

What is claimed is:

1. A method for data communication between an extended reality headset and a remote transceiver using light-based communication, the extended reality headset configured to track position and orientation movement of the extended reality headset, the extended reality headset having one or more light-based communication transceivers coupled to the extended reality headset, wherein the light-based communication transceivers are situated around a perimeter of the extended reality headset, the method comprising:
    determining a current position and orientation of the extended reality headset;
    determining a relative position of the remote transceiver with respect to the current position and orientation of the extended reality headset;
    calculating a line-of-sight from the light-based communication transceivers to the remote transceiver;
    selecting one of the light-based communication transceivers based on the calculated line-of-sight;
    causing the light-based communication transceivers to emit a light-based communications beam from the selected one of the light-based communication transceivers in accordance with the calculated line-of-sight; and
    causing an adjustment of the light-based communications beam in response to changes to the relative position of the remote transceiver with respect to the current position and orientation of the extended reality headset.

2. The method of claim 1, wherein the adjustment of the light-based communications beam is caused by electrical steering.

3. The method of claim 2, wherein causing the adjustment of the light-based communications beam comprises selecting a different light-based communication transceiver to emit the light-based communications beam.

4. The method of claim 1, wherein the adjustment of the light-based communications beam is caused by mechanical steering.

5. The method of claim 4, wherein the mechanical steering is implemented using movable mirrors.

6. The method of claim 1, further comprising:
    determining a relative position of a remote headset with respect to the current position and orientation of the extended reality headset;
    calculating a second line-of-sight from the light-based communication transceivers to the remote headset; and
    causing the light-based communication transceivers to emit a second light-based communications beam in accordance with the calculated second line-of-sight.

7. The method of claim 6, further comprising causing an adjustment of the second light-based communications beam in response to changes to the relative position of the remote headset with respect to the current position and orientation of the extended reality headset.

8. The method of claim 1, further comprising sending the current position and orientation of the extended reality headset to a remote system via a secondary communications link.

9. A system, comprising:
    an extended reality headset configured to track position and orientation movement of the extended reality headset, the extended reality headset having one or more light-based communication transceivers coupled to the extended reality headset, wherein the light-based communication transceivers are situated around a perimeter of the extended reality headset;
    a light-based access point configured to transmit and receive light-based communication signals with one or more devices; and
    the extended reality headset comprising a computer storage medium having instructions stored thereupon which, when executed by a processor, cause the extended reality headset to:
    determine a current position and orientation of the extended reality headset;
    determine a relative position of the light-based access point with respect to the current position and orientation of the extended reality headset;
    calculate a line-of-sight from the light-based communication transceivers to the light-based access point;
    select one of the light-based communication transceivers based on the calculated line-of-sight;
    cause the light-based communication transceivers to emit a light-based communications beam from the selected one of the light-based communication transceivers in accordance with the calculated line-of-sight; and
    cause an adjustment of the light-based communications beam in response to changes to the relative position of the light-based access point with respect to the current position and orientation of the extended reality headset.

10. The system of claim 9, wherein the adjustment of the light-based communications beam is caused by electrical steering.

11. The system of claim 9, wherein the adjustment of the light-based communications beam is caused by mechanical steering.

12. The system of claim 9, the extended reality headset further comprising instructions stored on the computer storage medium which, when executed by the processor, cause the extended reality headset to send the current position and orientation of the extended reality headset to the light-based access point via a secondary communications link.

13. The system of claim 12, wherein the light-based access point is further configured to:
    receive the current position and orientation from the extended reality headset; and
    in response to the received current position and orientation, cause an adjustment of a light-based communications beam emitted by the light-based access point in a direction of the received current position and orientation.

14. A head-mounted device comprising:
    one or more light-based communication transceivers coupled to the head-mounted device wherein the light-based communication transceivers are situated around a perimeter of the head-mounted device;
    a processor; and
    a computer storage medium having instructions stored thereupon which, when executed by the processor, cause the head-mounted device to perform operations comprising:
    determine a current position and orientation of the head-mounted device;
    determine a relative position of a light-based access point with respect to the current position and orientation of the head-mounted device;

calculate a line-of-sight from the light-based communication transceivers to the light-based access point;

select one of the light-based communication transceivers based on the calculated line-of-sight;

cause the light-based communication transceivers to emit a light-based communications beam from the selected one of the light-based communication transceivers in accordance with the calculated line-of-sight; and cause an adjustment of the light-based communications beam in response to changes to the relative position of the light-based access point with respect to the current position and orientation of the head-mounted device.

15. The head-mounted device of claim 14, wherein the adjustment of the light-based communications beam is caused by electrical steering.

16. The head-mounted device of claim 15, wherein causing the adjustment of the light-based communications beam comprises selecting a different light-based communication transceiver to emit the light-based communications beam.

17. The head-mounted device of claim 14, wherein the adjustment of the light-based communications beam is caused by mechanical steering.

18. The head-mounted device of claim 14, the computer storage medium having instructions stored thereupon which, when executed by the processor, cause the head-mounted device to perform operations comprising:

determine a relative position of a remote device with respect to the current position and orientation of the head-mounted device;

calculate a second line-of-sight from the light-based communication transceivers to the remote device;

cause the light-based communication transceivers to emit a second light-based communications beam in accordance with the calculated second line-of-sight; and cause an adjustment of the second light-based communications beam in response to changes to the relative position of the remote device with respect to the current position and orientation of the head-mounted device.

* * * * *